US012693134B2

(12) United States Patent
Singh et al.

(10) Patent No.: US 12,693,134 B2
(45) Date of Patent: Jul. 28, 2026

(54) SYSTEM FOR REAL-TIME DETERMINATION OF CALIBRATION OF AN INERTIAL MEASUREMENT UNIT

(71) Applicant: The Goodyear Tire & Rubber Company, Akron, OH (US)

(72) Inventors: Kanwar Bharat Singh, Copley, OH (US); Vamsi Krishna Vegamoor, Akron, OH (US); Seyed Amin Sajadi Alamdari, Trier (DE); Sparsh Sharma, Luxembourg City (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 18/507,762

(22) Filed: Nov. 13, 2023

(65) Prior Publication Data

US 2024/0192022 A1     Jun. 13, 2024

Related U.S. Application Data

(60) Provisional application No. 63/386,325, filed on Dec. 7, 2022.

(51) Int. Cl.
*G01C 21/00*     (2006.01)
*B60W 40/105*     (2012.01)

(52) U.S. Cl.
CPC ....... *G01C 21/3844* (2020.08); *B60W 40/105* (2013.01); *B60W 2520/105* (2013.01); *B60W 2520/125* (2013.01)

(58) Field of Classification Search
CPC ............ G01C 21/3844; B60W 40/105; B60W 2520/125
See application file for complete search history.

(56) References Cited

U.S. PATENT DOCUMENTS

| | | | |
|---|---|---|---|
| 5,442,560 A | 8/1995 | Kau | |
| 5,991,692 A | 11/1999 | Spencer, II | |

(Continued)

FOREIGN PATENT DOCUMENTS

| | | |
|---|---|---|
| EP | 2345870 A3 | 12/2012 |
| EP | 2753941 A4 | 4/2015 |

(Continued)

OTHER PUBLICATIONS

Search Report for European application No. EP23213825 dated Apr. 24, 2024.

*Primary Examiner* — Adnan M Mirza
(74) *Attorney, Agent, or Firm* — Edward T. Kennedy

(57)     ABSTRACT

A system for real-time determination of calibration of an inertial measurement unit includes an inertial measurement unit and a processor in electronic communication with the inertial measurement unit. A road mapping module receives a vehicle latitude and a vehicle longitude, and determines a virtual heading angle of a vehicle. A virtual acceleration module receives the virtual heading angle of the vehicle, and a measured vehicle speed and heading angle, and estimates a virtual lateral acceleration and a virtual longitudinal acceleration. A correlation module receives the virtual lateral acceleration, the virtual longitudinal acceleration, a calibrated measured lateral acceleration, and a calibrated measured longitudinal acceleration. The correlation module determines a correlation between the virtual lateral acceleration and the calibrated measured lateral acceleration, and between the virtual longitudinal acceleration and the calibrated measured longitudinal acceleration. A notice is generated by the correlation module indicating a result of the correlation.

19 Claims, 7 Drawing Sheets

(56) References Cited

U.S. PATENT DOCUMENTS

| | | |
|---|---|---|
| 6,738,714 B2 | 5/2004 | Mccall et al. |
| 7,274,504 B2 | 9/2007 | Crane et al. |
| 8,138,938 B2 | 3/2012 | Troy et al. |
| 8,566,071 B2 | 10/2013 | Shumaker et al. |
| 8,730,115 B2 | 5/2014 | Yeshanov et al. |
| 9,528,834 B2 | 12/2016 | Breed et al. |
| RE47,648 E | 10/2019 | Reeve et al. |
| 10,579,068 B2 | 3/2020 | Madsen et al. |
| 11,002,859 B1 | 5/2021 | Zhang et al. |
| 11,364,885 B2 | 6/2022 | Viele |
| 11,409,003 B1 | 8/2022 | Alexander |
| 11,530,934 B2 | 12/2022 | Becheret |
| 2016/0054355 A1 | 2/2016 | Schlager et al. |
| 2018/0025632 A1 | 1/2018 | Breed et al. |
| 2018/0164126 A1 | 6/2018 | Schubert et al. |
| 2020/0264011 A1 | 8/2020 | Lu et al. |
| 2020/0408529 A1* | 12/2020 | Zeng ..................... G01S 7/4808 |
| 2021/0140795 A1 | 5/2021 | Jozsa |
| 2021/0181318 A1 | 6/2021 | Li et al. |
| 2022/0187420 A1 | 6/2022 | Cole et al. |
| 2022/0187421 A1 | 6/2022 | Cole et al. |
| 2022/0348188 A1* | 11/2022 | Green ................... B60W 40/12 |
| 2023/0039129 A1 | 2/2023 | Ruppel et al. |

FOREIGN PATENT DOCUMENTS

| | | | |
|---|---|---|---|
| EP | 3650932 | B1 | 2/2023 |
| WO | 2013033755 | A1 | 3/2013 |

* cited by examiner

SYSTEM FOR REAL-TIME DETERMINATION OF CALIBRATION OF AN INERTIAL MEASUREMENT UNIT

FIELD OF THE INVENTION

The invention relates generally to tire estimation systems. More particularly, the invention relates to systems that employ sensors mounted on vehicles, wheels, and/or tires which are used to estimate tire characteristics. Specifically, the invention is directed to a system for real-time determination of calibration of an inertial measurement unit that is mounted on a vehicle, wheel, and/or tire to ensure the measurements of the inertial measurement unit are accurate.

BACKGROUND OF THE INVENTION

It is known in the art that multiple tires support a vehicle, and each tire is mounted on a wheel that is rotatably connected to a suspension system of the vehicle. To estimate characteristics of a tire during operation, sensors have been mounted on the vehicle, the wheels, and/or the tires to monitor or measure certain parameters. These measured parameters include acceleration of the vehicle or a tire, as well as rotation of a tire, which are used in algorithms to estimate characteristics such as tire load, tire wear, tire deflection, tire slip, tire friction, and more.

Acceleration and rotation are typically measured with an inertial measurement unit sensor, referred to as an inertial measurement unit, which may be mounted on the vehicle, on a wheel, and/or on a tire. The inertial measurement unit measures acceleration and rotation of the component to which it is mounted. Thus, when the inertial measurement unit is mounted to the frame of the vehicle, it measures the acceleration of the vehicle, and when it is mounted to the wheel or the tire, it measures the acceleration and/or rotation of the wheel or tire.

In the art, lateral acceleration, longitudinal acceleration, vertical acceleration, and rotation are often measured by an inertial measurement unit that is included in a telematic control unit. A telematic control unit is a control and communication system that is connected to the vehicle to enable collection of vehicle and tire data, and transmission of the data to remote units or cloud computing services. While a telematic control unit may also be mounted to the wheel or to the tire, reference herein shall be made to a vehicle-mounted telematic control unit for the purpose of convenience, with the understanding that such reference includes wheel and tire mounted units.

In many cases, the axis of an inertial measurement unit in a telematic control unit may not be aligned with the axis of vehicle. For example, the telematic control unit may have not been firmly mounted to the vehicle, allowing it to shift, or may have been dislocated during driving or loading and unloading of the vehicle. The telematic control unit may have been moved to a different vehicle, or the calibration of the inertial measurement unit may be out of date, which may allow for measurement error to occur over time. Lack of alignment of an inertial measurement unit with the axis of vehicle due to any of these factors may negatively impact the quality or accuracy of the measurements of the inertial measurement unit, including acceleration and rotation measurements, which in turn may undesirably reduce the accuracy of the algorithms that use these measurements.

As a result, there is a need in the art for a system that provides real-time determination of calibration of an inertial measurement unit to ensure use of accurate measurements from the inertial measurement unit.

SUMMARY OF THE INVENTION

According to an aspect of an exemplary embodiment of the invention, a system for real-time determination of calibration of an inertial measurement unit is provided. The system includes an inertial measurement unit mounted on at least one of a vehicle, a tire supporting the vehicle, and a wheel on which the tire is mounted. A processor is in electronic communication with the inertial measurement unit. A road mapping module is in electronic communication with the processor, receives a vehicle latitude and a vehicle longitude, and determines a virtual heading angle of the vehicle. A virtual acceleration module is in electronic communication with the processor, receives the virtual heading angle of the vehicle from the road mapping module, receives a measured vehicle speed and a measured heading angle, and estimates a virtual lateral acceleration and a virtual longitudinal acceleration. A correlation module is in electronic communication with the processor, receives the virtual lateral acceleration and the virtual longitudinal acceleration from the virtual acceleration module, and receives a calibrated measured lateral acceleration and a calibrated measured longitudinal acceleration from the inertial measurement unit. The correlation module determines a correlation between the virtual lateral acceleration and the calibrated measured lateral acceleration, and between the virtual longitudinal acceleration and the calibrated measured longitudinal acceleration. A notice is generated by the correlation module to indicate a result of the correlation.

BRIEF DESCRIPTION OF THE DRAWINGS

The invention will be described by way of example and with reference to the accompanying drawings, in which.

Similar numerals refer to similar parts throughout the drawings.

Definitions

"Axial" and "axially" means lines or directions that are parallel to the axis of rotation of the tire.

"CAN bus" or "CAN bus system" is an abbreviation for controller area network system, which is a vehicle bus standard designed to allow microcontrollers and devices to communicate with each other within a vehicle without a host computer.

"Circumferential" means lines or directions extending along the perimeter of the surface of the annular tread perpendicular to the axial direction.

"Equatorial centerplane" means the plane perpendicular to the tire's axis of rotation and passing through the center of the tread.

"Footprint" means the contact patch or area of contact created by the tire tread with a flat surface as the tire rotates or rolls.

"Inboard side" means the side of the tire nearest the vehicle when the tire is mounted on a wheel and the wheel is mounted on the vehicle.

"Lateral" means an axial direction.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Tread element" or "traction element" means a rib or a block element defined by a shape having adjacent grooves.

DETAILED DESCRIPTION OF THE INVENTION

Figures 1, 2:
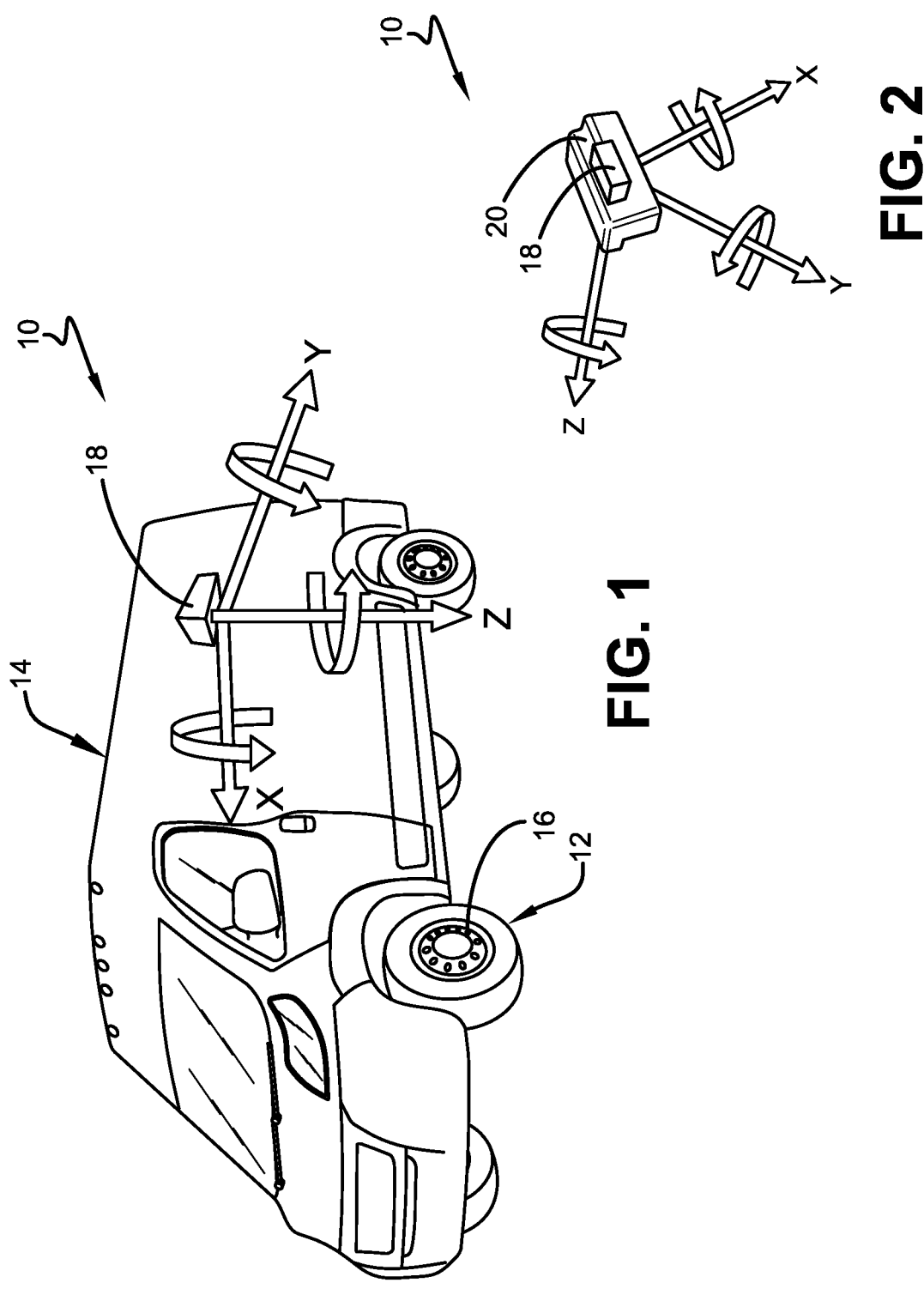
FIG. 1 is a schematic perspective view of a vehicle and tires employing an exemplary embodiment of the system for real-time determination of calibration of an inertial measurement unit of the present invention.
FIG. 2 is a schematic perspective view of a telematic control unit employed in connection with the exemplary embodiment of the system for real-time determination of calibration of an inertial measurement unit of the present invention.
Figure 3:
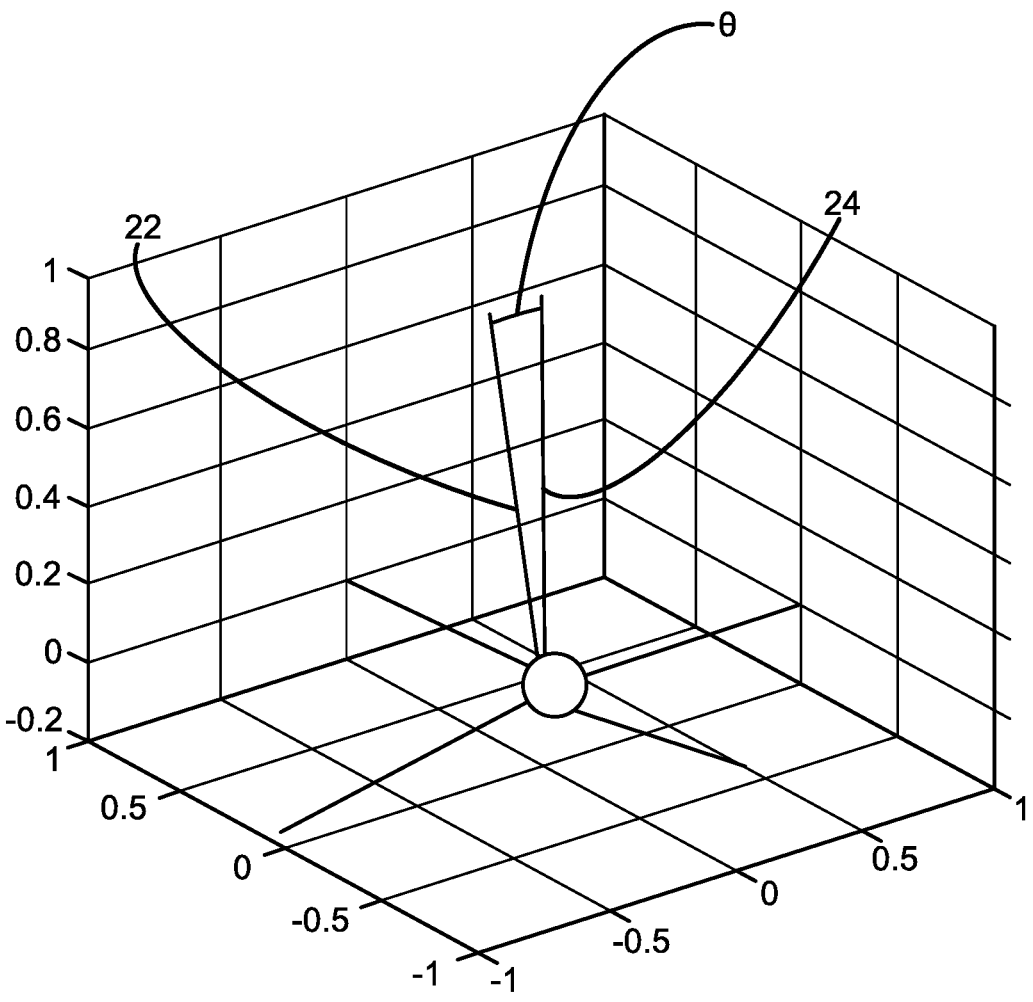
FIG. 3 is a graphical representation of lack of alignment of an axis of an inertial measurement unit with an axis of a vehicle.

With reference to FIGS. 1 through 8, an exemplary embodiment of a system for real-time determination of calibration of an inertial measurement unit of the present invention is indicated at 10. With particular reference to FIG. 1, multiple tires 12 support a vehicle 14, and each tire is mounted on a wheel 16 that is rotatably connected to a suspension system (not shown) of the vehicle. While the vehicle 14 is depicted as a van, the invention is not to be so restricted. The principles of the invention find application in other vehicle categories, such as passenger cars, commercial trucks, off-the-road vehicles, and the like, in which vehicles may be supported by more or fewer tires 12 than those shown in FIG. 1.

To estimate characteristics of each tire 12, such as wear, load, slip, and the like, parameters such as acceleration of the vehicle 14 or a tire may be measured. Acceleration and rotation are typically measured with an inertial measurement unit sensor, referred to as an inertial measurement unit 18, which may be mounted on the vehicle 14, on a wheel 16, and/or on a tire 20. With additional reference to FIG. 2, the inertial measurement unit 18 may be included in a telematic control unit 20, which enables collection of data and transmission of the data to remote units or cloud computing services. While the telematic control unit 20 may be mounted to the vehicle 14, to a wheel 16, or to a tire 12, reference herein shall be made to a vehicle-mounted telematic control unit for the purpose of convenience, with the understanding that such reference includes wheel and tire mounted units.

The inertial measurement unit 18 preferably measures acceleration and rotation along three (3) axes, including a lateral axis Y, a longitudinal axis X, and a vertical axis Z. For the purpose of convenience, a base axis of the inertial measurement unit 18 is indicated at 22 in FIG. 3. One or more of the axes 22 of the inertial measurement unit 18, particularly when the inertial measurement unit is included in a telematic control unit 20, may not be aligned with corresponding axes of vehicle 14. For the purpose of convenience, a base axis of the vehicle 14 is indicated at 24. By way of example, the base axis 22 of the inertial measurement unit 18 is shown as being out of alignment with the base axis 24 of the vehicle 14 by an amount indicated as θ degrees. Such lack of alignment of the axis 22 of the inertial measurement unit 18 with the axis 24 of the vehicle 14 may negatively impact the accuracy of acceleration and rotation measurements of the inertial measurement unit, which in turn may undesirably reduce the accuracy of wear, load, slip, and other algorithms that use these measurements.

The system 10 for real-time determination of calibration of the inertial measurement unit 18 provides a correlation of measurements to ensure the base axis 22 of the inertial measurement unit is aligned with the base axis 24 of the vehicle 14 for use of accurate measurements of acceleration and rotation from the inertial measurement unit.

Figure 4:
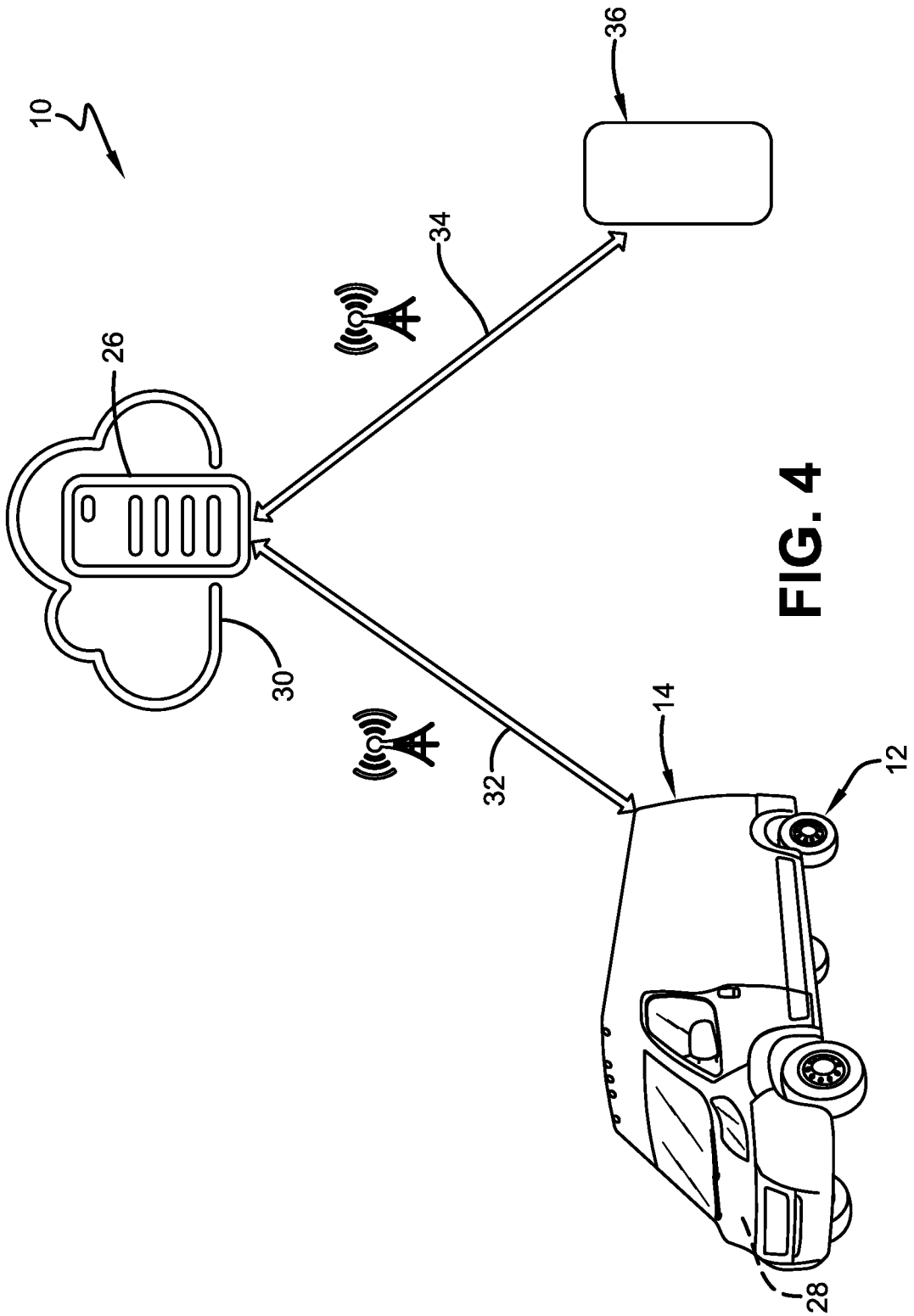
FIG. 4 is a schematic representation of data transmission to a cloud-based server and to a display device.

Turning to FIG. 4, aspects of the system 10 for real-time determination of calibration of the inertial measurement unit 18 preferably are executed on a processor 26. The processor 26 enables input of parameters and execution of specific techniques to be described below, which are stored in a suitable storage medium and are in electronic communication with the processor. The processor 26 may be mounted on the vehicle 14, may be in communication with an electronic control system 28 of the vehicle, such as the vehicle CAN bus system, and/or may be a remote processor in a cloud-based server 30.

Wireless transmission means 32, such as an antenna, may wirelessly send the acceleration and rotation measurements of the inertial measurement unit 18 from the telematic control unit 20 (FIG. 2) to the processor 26. Output from the system 10 may be wirelessly transmitted by an antenna 34 from the processor 26 to a display or controller device 36 and/or to the electronic control system 28 of the vehicle 14.

Figure 5:
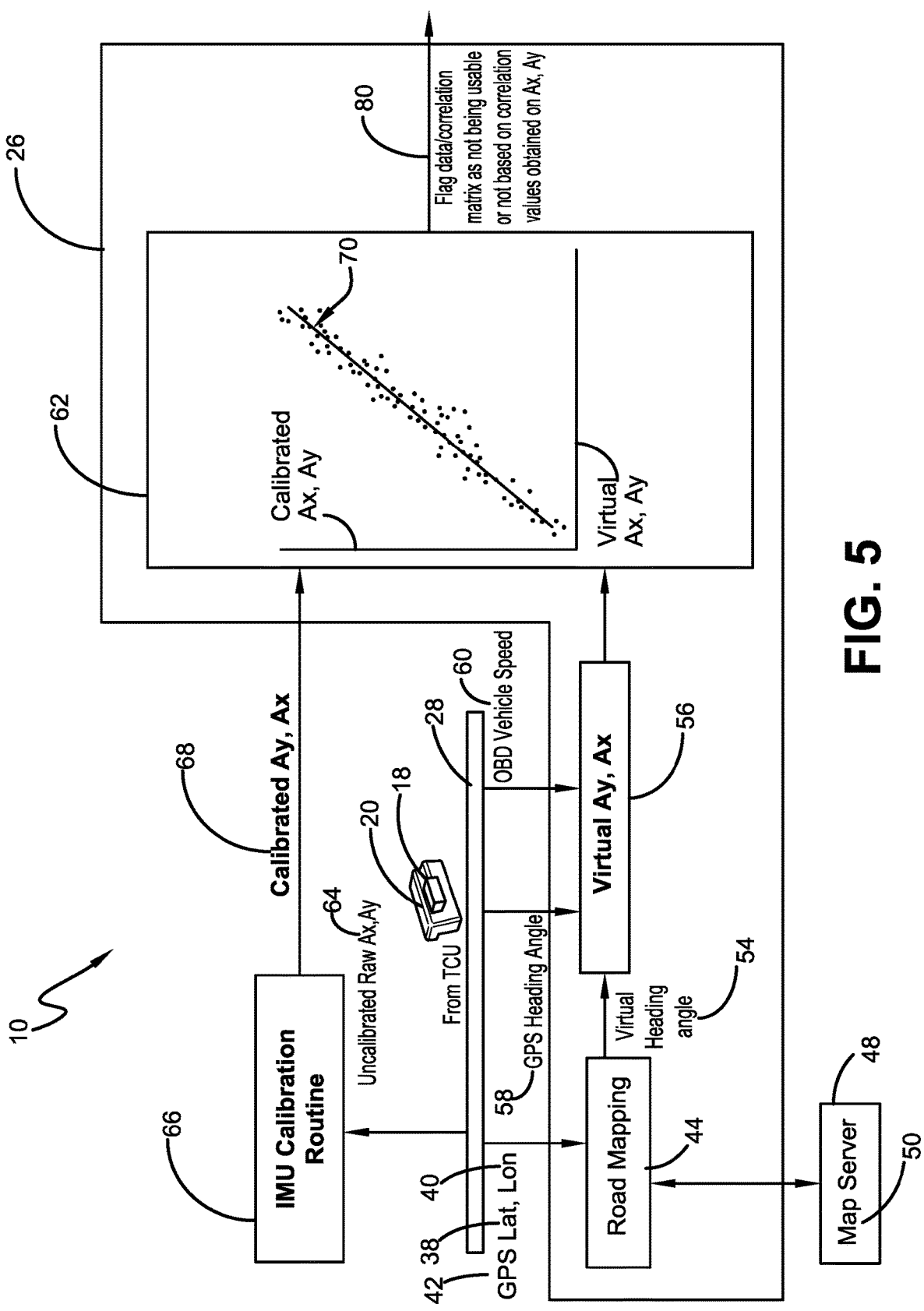
FIG. 5 is a schematic representation of an exemplary embodiment of the system for real-time determination of calibration of an inertial measurement unit of the present invention.

With reference to FIG. 5, the system 10 for real-time determination of calibration of the inertial measurement unit 18 employs includes multiple inputs to transform measurements from the base axis 22 of the inertial measurement unit 18 to the base axis 24 of the vehicle 14. In FIG. 5, lateral acceleration, which is the acceleration along the lateral axis Y (FIG. 1), is indicated as indicated as Ay, and longitudinal acceleration, which is the acceleration along the longitudinal axis X, is indicated as Ax.

A vehicle latitude 38 and a vehicle longitude 40 are received from a global positioning system (GPS) unit 42 and are input into a road mapping module 44. The road mapping module 44 is stored on or is in electronic communication with the processor 26, which in turn is in electronic communication with an electronic control system 28 of the vehicle, such as the vehicle CAN bus system. The GPS unit 42 preferably is also in electronic communication with the electronic control system 28 of the vehicle, thereby enabling electronic communication of the vehicle latitude 38 and vehicle longitude 40 to the road mapping module 44. Each communication or transmission of the vehicle latitude 38 and the vehicle longitude 40 preferably receives a timestamp, which is a digital identification of the time at which the vehicle latitude 38 and the vehicle longitude 40 are recorded and/or transmitted.

Figure 6:
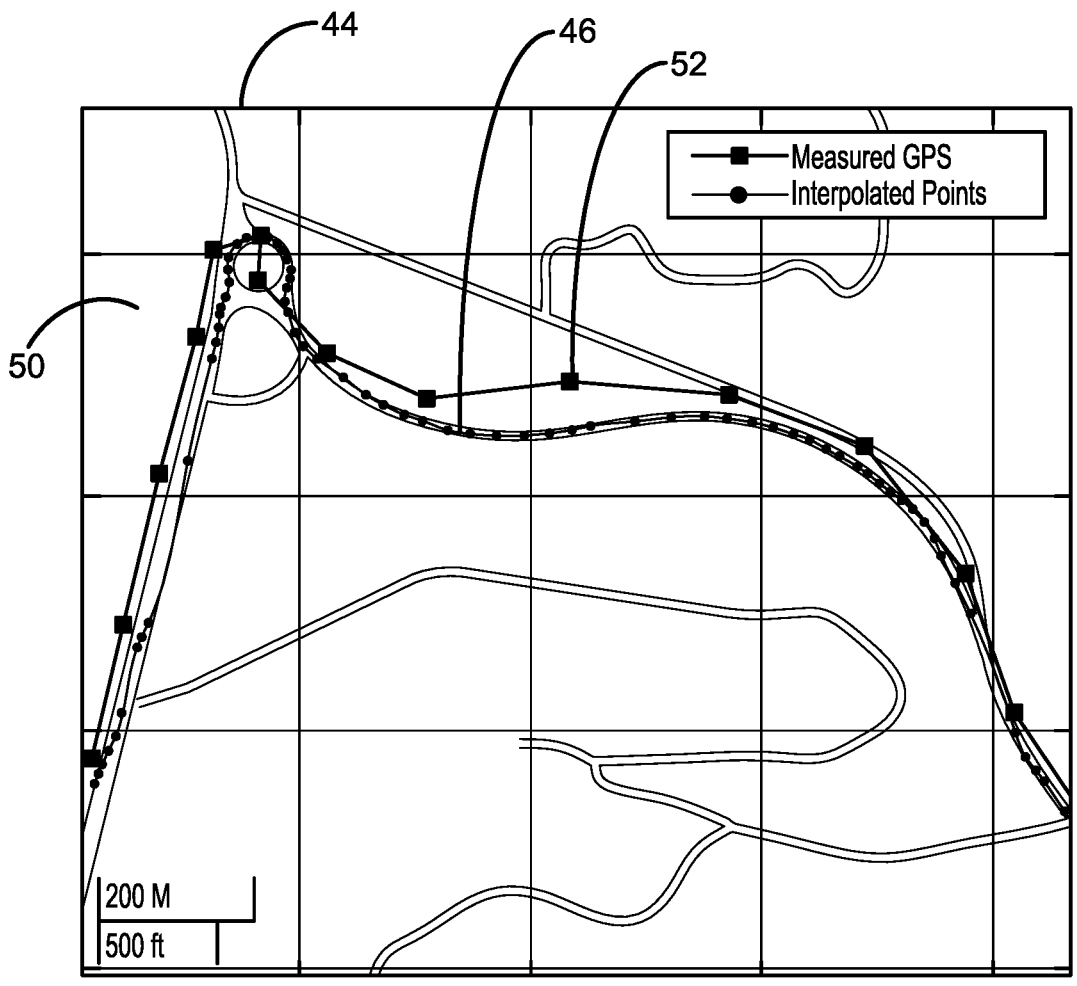
FIG. 6 is a schematic representation of an aspect of the system shown in FIG. 5.

With additional reference to FIG. 6, the road mapping module 44 employs multiple vehicle latitude 38 and a vehicle longitude 40 coordinates from the GPS unit 42 to determine a position and a measured trajectory 46 of the vehicle 14. The road mapping module 44 preferably is in electronic communication with a map server 48, which includes digital maps 50. The road mapping module 44 receives the digital maps 50 and corrects the measured trajectory 46 of the vehicle 14 using road information from the digital maps, interpolating as necessary to fill in any missing GPS points and generate an enhanced trajectory 52. The road mapping module 44 uses the enhanced trajectory 52 to determine a virtual heading angle 54 of the vehicle 14 at each point in time.

The road mapping module 44 outputs the virtual heading angle 52 into a virtual acceleration module 56. The virtual acceleration module 56 is stored on or is in electronic communication with the processor 26, which in turn is in electronic communication with an electronic control system 28 of the vehicle, such as the vehicle CAN bus system. A measured vehicle speed 58 is obtained from the GPS unit 42 or another vehicle sensor, such as a speedometer. A measured heading angle 60 of the vehicle 14 is also obtained from the GPS unit 42 or another vehicle sensor. Because the GPS unit 42 is also in electronic communication with the electronic control system 28 of the vehicle, the measured vehicle speed 58 and the measured heading angle 60 are electronically communicated to the virtual acceleration module 56. Each communication or transmission of the measured vehicle speed 58 and the measured heading angle 60 receives a timestamp.

The virtual acceleration module 56 thus receives the time-stamped virtual heading angle 54, the measured vehicle speed 58, and the measured heading angle 60. Because acceleration is calculated as a change in velocity per change in time, the virtual acceleration module 56 calculates acceleration from multiple sets of time-stamped virtual heading angles 54, measured vehicle speeds 58, and measured heading angles 60. The virtual heading angles 54 and the measured heading angles 60 enable estimation of a virtual lateral acceleration Ay and a virtual longitudinal acceleration Ax. The virtual lateral acceleration Ay and a virtual longitudinal acceleration Ax estimated by the virtual acceleration module 56 are input into a correlation module 62, as will be described below.

The inertial measurement unit 18 in the telematic control unit 20 may output a time-stamped uncalibrated 64 measured longitudinal acceleration Ax and lateral acceleration Ay. Many telematic control units 20 and/or inertial measurement units 18 are equipped with a calibration routine 66 for the inertial measurement unit. Preferably, the calibration routine 66 is executed, resulting in a calibrated 68 measured longitudinal acceleration Ax and lateral acceleration Ay from the inertial measurement unit 18. The calibrated 68 measured longitudinal acceleration Ax and lateral acceleration Ay are input into the correlation module 62.

Figure 7:
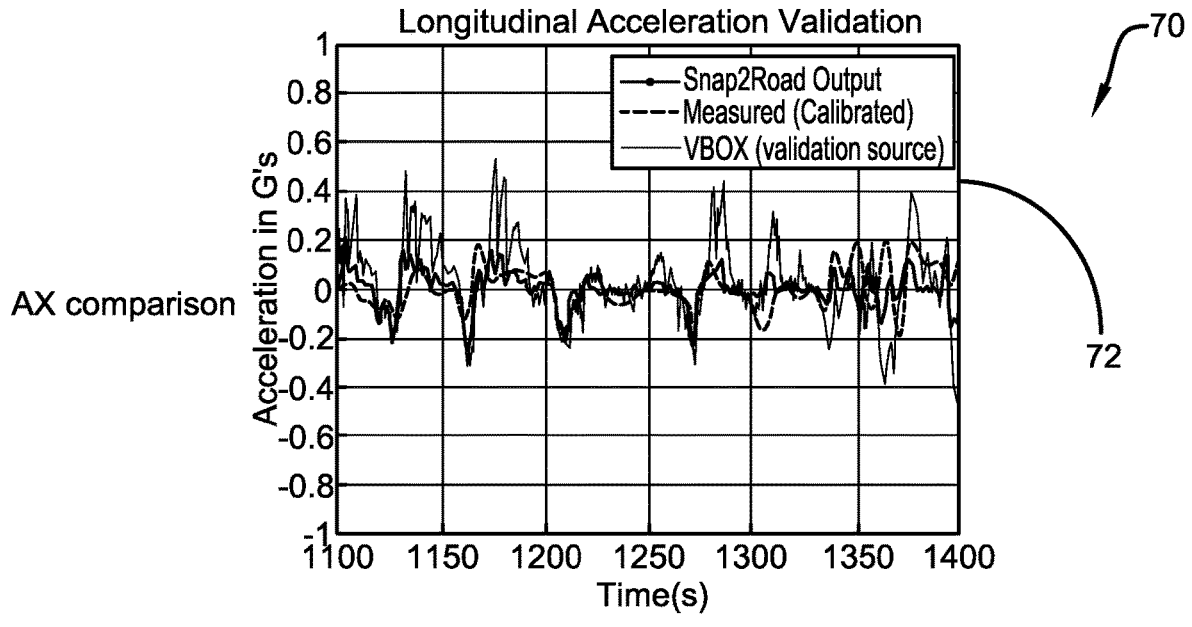
FIG. 7 is a graphical representation of an aspect of the system shown in FIG. 5.
Figure 7:
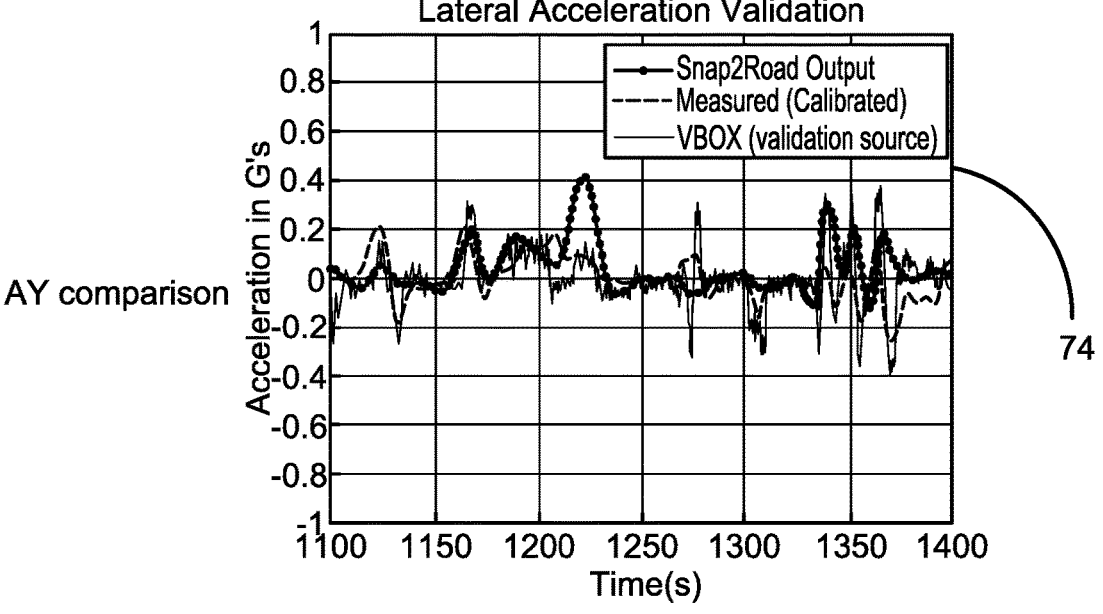
Figure 8:
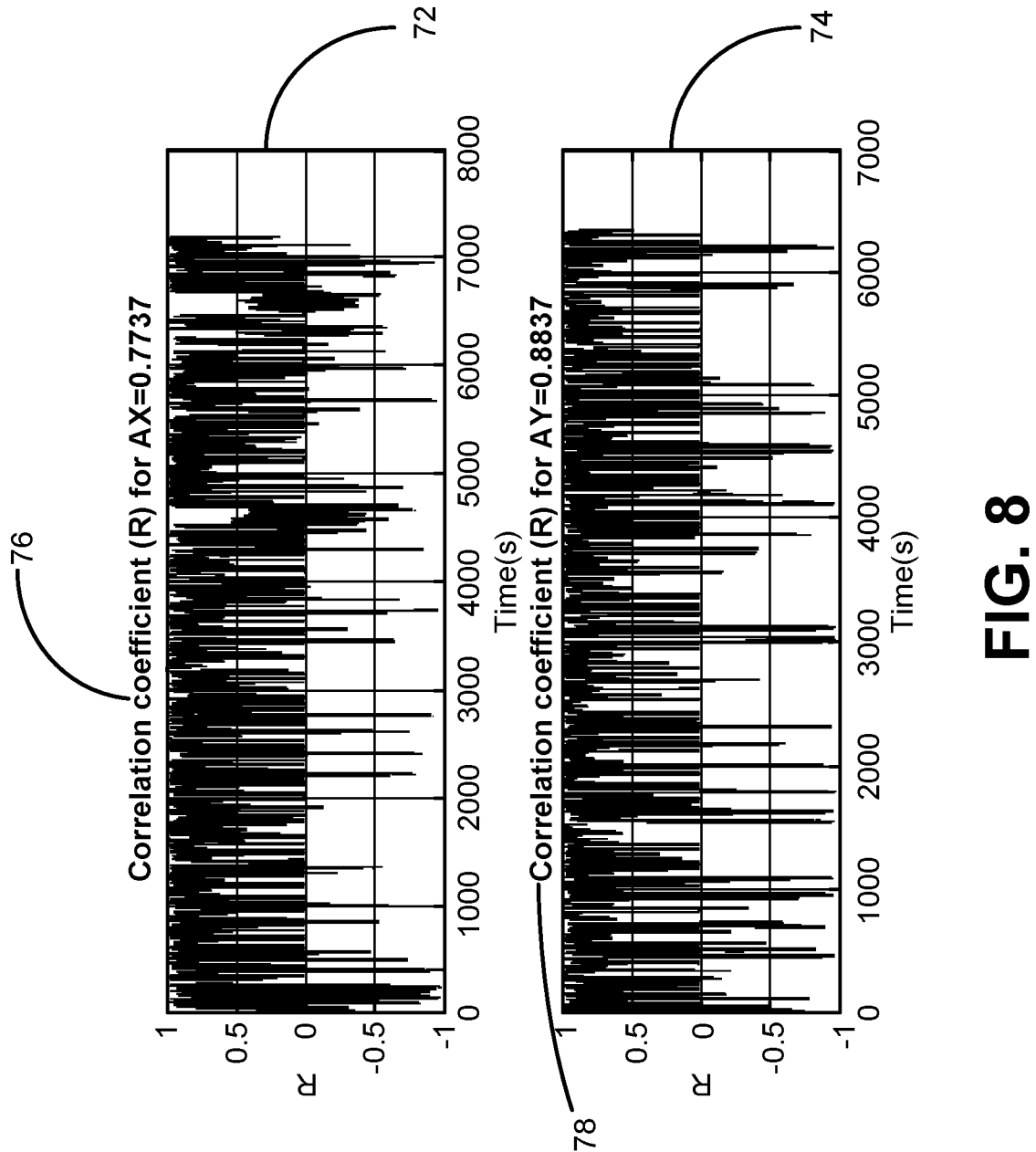
FIG. 8 is a graphical representation of another aspect of the system shown in FIG. 5.

With additional reference to FIGS. 7 and 8, the correlation module 62 executes or determines a correlation 70 between the virtual lateral acceleration Ay and the virtual longitudinal acceleration Ax as estimated by the virtual acceleration module 56, and the calibrated 68 measured longitudinal acceleration Ax and lateral acceleration Ay. More particularly, the correlation 70 preferably includes a longitudinal acceleration correlation 72, which compares the virtual longitudinal acceleration Ax and the calibrated measured longitudinal acceleration Ax, and a lateral acceleration correlation 74, which compares the virtual lateral acceleration Ay and the calibrated measured lateral acceleration Ay.

A longitudinal acceleration correlation coefficient or quality indicator 76 may be generated by the correlation module 62 from the longitudinal acceleration correlation 72. Likewise, a lateral acceleration correlation coefficient or quality indicator 78 may be generated by the correlation module 62 from the lateral acceleration correlation 74. The longitudinal acceleration correlation coefficient 76 and the lateral acceleration correlation coefficient 78 indicate the quality of the alignment of the axis 22 of the inertial measurement unit 18 with the axis 24 of the vehicle 14.

If the magnitude of each of the longitudinal acceleration correlation coefficient 76 and the lateral acceleration correlation coefficient 78 is high, good alignment is present, and the calibration of the inertial measurement unit 18 can be trusted. In this case, measurements of acceleration and rotation from the inertial measurement unit 18 are likely to be accurate, and may be used in wear, load, slip, and other algorithms. The magnitude of each of the longitudinal acceleration correlation coefficient 76 and the lateral acceleration correlation coefficient 78 may be indicated as an output plot (FIG. 8), or as a linear representation (FIG. 5) in which a slope of the line is measured. By way of example, a high magnitude for each of the longitudinal acceleration correlation coefficient 76 and the lateral acceleration correlation coefficient 78 may be a value of one (1) or near one (1).

If the magnitude of each of the longitudinal acceleration correlation coefficient 76 and the lateral acceleration correlation coefficient 78 is low, good alignment is not present, and the calibration of the inertial measurement unit 18 may not be able to be trusted. In this case, measurements of acceleration and rotation from the inertial measurement unit 18 may not be accurate, and should not be used in wear, load, slip, and other algorithms. By way of example, a high magnitude for each of the longitudinal acceleration correlation coefficient 76 and the lateral acceleration correlation coefficient 78 may be a value of zero (0) or near zero (0).

Because the longitudinal acceleration correlation coefficient 76 and the lateral acceleration correlation coefficient 78 are correlation coefficients, assignment of a positive or negative sign convention is optional, which may simplify the system 10. A sign convention may be employed to determine the quality of calibration and to correct it. For example, if there is a high magnitude for one of the longitudinal acceleration correlation coefficient 76 and the lateral acceleration correlation coefficient 78, but the value is negative, the negative value indicates the calibration along that axis may be offset by one-hundred eighty (180) degrees. In such a case, the sign may need to be switched from negative to positive to correct the calibration.

As shown in FIG. 5, the system 10, and specifically the correlation module 62, generates an electronic flag or notice 80 based on the magnitude of the longitudinal acceleration correlation coefficient 76 and the lateral acceleration correlation coefficient 78. More particularly, if both of the longitudinal acceleration correlation coefficient 76 and the lateral acceleration correlation coefficient 78 have a high magnitude, the electronic notice 80 indicates that measurements of acceleration and rotation from the inertial measurement unit 18 are accurate and can be used. If one or both of the longitudinal acceleration correlation coefficient 76 and the lateral acceleration correlation coefficient 78 have a low magnitude, the electronic notice 80 indicates that measurements of acceleration and rotation from the inertial measurement unit 18 may not be accurate and should not be used. Returning to FIG. 4, output from the system 10, including the flag 80, may be transmitted from the processor 26 to a display or controller device 36 and/or to the electronic control system 28 of the vehicle 14.

In this manner, the system 10 for real-time determination of calibration of an inertial measurement unit 18 of the present invention provides a correlation 70 of virtual estimates to actual measurements of the inertial measurement unit. The correlation 70 ensures the base axis 22 of the inertial measurement unit 18 is aligned with the base axis 24 of the vehicle 14. When the correlation 70 indicates an accurate alignment, the measurements of acceleration and rotation from the inertial measurement unit 18 are likely to be accurate and the system 10 provides a notice 80 that they may be used in in algorithms to estimate characteristics such as tire load, tire wear, tire deflection, tire slip, tire friction, and the like. When the correlation 70 indicates a lack of alignment, the measurements from the inertial measurement unit 18 are designated as not likely to be accurate, and the system 10 provides a notice 80 that they should not be used in estimation algorithms. The correlation of the system 10 preferably is performed in real time as the vehicle 14 is operating.

The present invention also includes a method for real-time determination of calibration of an inertial measurement unit 18. The method includes steps in accordance with the description that is presented above and shown in FIGS. 1 through 8.

It is to be understood that the structure and method of the above-described system for real-time determination of calibration of an inertial measurement unit may be altered or rearranged, or components or steps known to those skilled in the art omitted or added, without affecting the overall concept or operation of the invention. For example, electronic communication may be through a wired connection or wireless communication without affecting the overall concept or operation of the invention. Such wireless communications include radio frequency (RF) and Bluetooth® communications.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A system for real-time determination of calibration of an inertial measurement unit, the system comprising:
   an inertial measurement unit mounted on at least one of a vehicle, a tire supporting the vehicle, and a wheel on which the tire is mounted;
   a processor in electronic communication with the inertial measurement unit;
   a road mapping module in electronic communication with the processor, the road mapping module receiving a vehicle latitude and a vehicle longitude and determining a virtual heading angle of the vehicle;
   a virtual acceleration module in electronic communication with the processor, the virtual acceleration module receiving the virtual heading angle of the vehicle from the road mapping module and receiving a measured vehicle speed and a measured heading angle, the virtual acceleration module estimating a virtual lateral acceleration and a virtual longitudinal acceleration;
   a correlation module in electronic communication with the processor, the correlation module receiving the virtual lateral acceleration and the virtual longitudinal acceleration from the virtual acceleration module and receiving a calibrated measured lateral acceleration and a calibrated measured longitudinal acceleration from the inertial measurement unit, the correlation module determining a lateral acceleration correlation between the virtual lateral acceleration and the calibrated measured lateral acceleration and a longitudinal acceleration correlation between the virtual longitudinal acceleration and the calibrated measured longitudinal acceleration;
   the correlation module generating from the longitudinal acceleration correlation a longitudinal acceleration coefficient as a longitudinal quality indicator, and generating from the lateral acceleration correlation a lateral acceleration coefficient as a lateral quality indicator, the longitudinal acceleration coefficient and the lateral acceleration coefficient indicating a quality of alignment of an axis of the inertial measurement unit with an axis of the vehicle; and
   a notice being generated by the correlation module, the notice indicating a result of the correlation.

2. The system for real-time determination of calibration of an inertial measurement unit of claim 1, wherein the notice is generated in real time as the vehicle is operating.

3. The system for real-time determination of calibration of an inertial measurement unit of claim 1, wherein the vehicle latitude and the vehicle longitude are obtained from a global positioning system unit.

4. The system for real-time determination of calibration of an inertial measurement unit of claim 1, wherein the road mapping module is in electronic communication with a map server.

5. The system for real-time determination of calibration of an inertial measurement unit of claim 4, wherein the road mapping module corrects a measured trajectory of the vehicle and generates an enhanced trajectory of the vehicle from digital maps of the map server.

6. The system for real-time determination of calibration of an inertial measurement unit of claim 1, wherein the measured vehicle speed and the measured heading angle are obtained from a global positioning system unit.

7. The system for real-time determination of calibration of an inertial measurement unit of claim 1, wherein the inertial measurement unit executes a calibration routine to generate the calibrated measured longitudinal acceleration and the calibrated measured lateral acceleration.

8. The system for real-time determination of calibration of an inertial measurement unit of claim 1, wherein the correlation module generates the longitudinal acceleration correlation coefficient from the correlation between the virtual longitudinal acceleration and the calibrated measured longitudinal acceleration.

9. The system for real-time determination of calibration of an inertial measurement unit of claim 8, wherein when a magnitude of the longitudinal acceleration correlation coefficient is high, the notice indicates measurements from the inertial measurement unit are accurate.

10. The system for real-time determination of calibration of an inertial measurement unit of claim 9, wherein a high magnitude of the longitudinal acceleration correlation coefficient includes a value of about one.

11. The system for real-time determination of calibration of an inertial measurement unit of claim 8, wherein when a magnitude of the longitudinal acceleration correlation coefficient is low, the notice indicates measurements from the inertial measurement unit are not accurate.

12. The system for real-time determination of calibration of an inertial measurement unit of claim 11, wherein a low magnitude of the longitudinal acceleration correlation coefficient includes a value of about zero.

13. The system for real-time determination of calibration of an inertial measurement unit of claim 1, wherein the correlation module generates the lateral acceleration correlation coefficient from the correlation between the virtual lateral acceleration and the calibrated measured lateral acceleration.

14. The system for real-time determination of calibration of an inertial measurement unit of claim 13, wherein when a magnitude of the lateral acceleration correlation coefficient is high, the notice indicates measurements from the inertial measurement unit are accurate.

15. The system for real-time determination of calibration of an inertial measurement unit of claim 14, wherein a high magnitude of the lateral acceleration correlation coefficient includes a value of about one.

16. The system for real-time determination of calibration of an inertial measurement unit of claim 13, wherein when a magnitude of the lateral acceleration correlation coefficient is low, the notice indicates measurements from the inertial measurement unit are not accurate.

17. The system for real-time determination of calibration of an inertial measurement unit of claim 16, wherein a low magnitude of the lateral acceleration correlation coefficient includes a value of about zero.

18. The system for real-time determination of calibration of an inertial measurement unit of claim 1, wherein the inertial measurement unit is included in a telematic control unit.

19. The system for real-time determination of calibration of an inertial measurement unit of claim 1, wherein the notice is transmitted from the processor to an electronic control system of the vehicle.

* * * * *